(12) United States Patent
Beaver

(10) Patent No.: US 9,320,363 B1
(45) Date of Patent: Apr. 26, 2016

(54) TEMPERATURE SENSING PLAYPEN ASSEMBLY

(71) Applicant: Mary Margaret Beaver, Coloma, CA (US)

(72) Inventor: Mary Margaret Beaver, Coloma, CA (US)

( * ) Notice: Subject to any disclaimer, the term of this patent is extended or adjusted under 35 U.S.C. 154(b) by 0 days.

(21) Appl. No.: 14/285,891

(22) Filed: May 23, 2014

(51) Int. Cl.
| E04H 15/10 | (2006.01) |
| E04H 15/12 | (2006.01) |
| A47D 13/06 | (2006.01) |
| A47D 13/00 | (2006.01) |
| A47D 15/00 | (2006.01) |
| G01K 13/00 | (2006.01) |
| G01G 19/44 | (2006.01) |

(52) U.S. Cl.
CPC ............... *A47D 13/06* (2013.01); *A47D 15/00* (2013.01); *G01G 19/44* (2013.01); *G01K 13/00* (2013.01)

(58) Field of Classification Search
CPC ........ E04H 15/10; E04H 15/12; A47D 13/06; A47D 13/00; A47D 15/00
USPC ........... 5/93.1, 421, 284, 940; 135/91, 92, 96, 135/116
See application file for complete search history.

(56) References Cited

U.S. PATENT DOCUMENTS

| 1,748,932 | A |   | 2/1930 | Medart et al. |
| 1,900,274 | A |   | 3/1933 | Brockie |
| 2,715,530 | A | * | 8/1955 | William .......................... 472/40 |
| 3,173,155 | A |   | 3/1965 | Schweikert |
| 3,878,570 | A | * | 4/1975 | Donnelly ............................ 5/97 |
| 4,073,017 | A | * | 2/1978 | Stevens ............................... 5/97 |
| 4,739,527 | A |   | 4/1988 | Kohus et al. |
| 4,823,415 | A | * | 4/1989 | Lampard .......................... 5/93.1 |
| 5,216,948 | A | * | 6/1993 | Sheppard et al. ............... 99/483 |
| 5,389,037 | A | * | 2/1995 | Hale ............................. 454/284 |
| D366,978 | S | * | 2/1996 | Mariol ...................... D6/718.29 |
| 5,553,336 | A |   | 9/1996 | Mariol |
| 5,560,055 | A |   | 10/1996 | Ziegler |
| 5,813,064 | A |   | 9/1998 | Hartenstine |
| 5,862,548 | A |   | 1/1999 | Gerhart |
| 6,109,280 | A |   | 8/2000 | Custer |
| 6,119,288 | A | * | 9/2000 | Hendrickson ........................ 5/97 |
| 6,123,091 | A | * | 9/2000 | Flynn et al. ...................... 135/96 |
| 6,354,004 | B1 | * | 3/2002 | Worsham ..................... 29/897.3 |
| 6,582,456 | B1 | * | 6/2003 | Hand et al. ..................... 607/108 |
| 6,799,337 | B1 | * | 10/2004 | Raphael-Davis et al. ........ 5/93.1 |
| 7,196,289 | B2 | * | 3/2007 | Ellis et al. ..................... 219/217 |
| D626,755 | S |   | 11/2010 | Spitz |
| 8,257,229 | B2 | * | 9/2012 | Myers et al. .................... 482/35 |

(Continued)

OTHER PUBLICATIONS

Mothercare, Lindam Safe and Secure Fabric Playpen I Mothercare, Mar. 18, 2013, Youtube, www.youtube.com/watch?v=QDhu2FsWcXA.*

*Primary Examiner* — David E Sosnowski
*Assistant Examiner* — Ifeolu Adeboyejo

(57) ABSTRACT

A temperature sensing playpen assembly includes a base frame that may be positioned on a support surface. A child may be positioned within the base frame. A wall is coupled to and encloses the base frame. A pad is positionable on a floor of the base frame so the pad may cushion the floor of the base frame. A canopy frame is removably positionable on a top of the base frame. An umbrella is coupled to the canopy frame. A control panel is coupled to the base frame. An alarm is coupled to the control panel. The alarm is operationally coupled to the control panel. A pressure sensor is coupled to the pad. The pressure sensor is operationally coupled to the control panel. A temperature sensor is coupled to the canopy frame. The temperature sensor is operationally coupled to the alarm so the alarm emits an audible alarm.

15 Claims, 5 Drawing Sheets

(56) References Cited

U.S. PATENT DOCUMENTS

2005/0045221 A1* 3/2005 Forshpan ................. 135/135
2005/0278863 A1* 12/2005 Bahash et al. ............... 5/726
2009/0177257 A1* 7/2009 Khodak et al. ............. 607/96
2011/0115635 A1* 5/2011 Petrovski et al. .......... 340/584
2012/0012143 A1* 1/2012 Mohamed .................. 135/96
2014/0137324 A1* 5/2014 Doering et al. ............ 5/93.1

* cited by examiner

TEMPERATURE SENSING PLAYPEN ASSEMBLY

BACKGROUND OF THE DISCLOSURE

Field of the Disclosure

The disclosure relates to temperature sensing playpen devices and more particularly pertains to a new temperature sensing playpen device for protecting a child from a dangerous temperature.

SUMMARY OF THE DISCLOSURE

An embodiment of the disclosure meets the needs presented above by generally comprising a base frame that may be positioned on a support surface. A child may be positioned within the base frame. A wall is coupled to the base frame so the wall may enclose a center of the base frame. A pad is positionable on a floor of the base frame so the pad may cushion the floor of the base frame. A canopy frame is removably positionable on a top of the base frame so the canopy frame extends upwardly from the base frame. An umbrella is coupled to the canopy frame so the umbrella may shade the base frame. A control panel is coupled to the base frame. An alarm is coupled to the control panel. The alarm is operationally coupled to the control panel. A pressure sensor is coupled to the pad so the pressure sensor may detect a weight on the pad. The pressure sensor is operationally coupled to the control panel. A temperature sensor is coupled to the canopy frame. The temperature sensor is operationally coupled to the alarm so the alarm emits an audible alarm.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
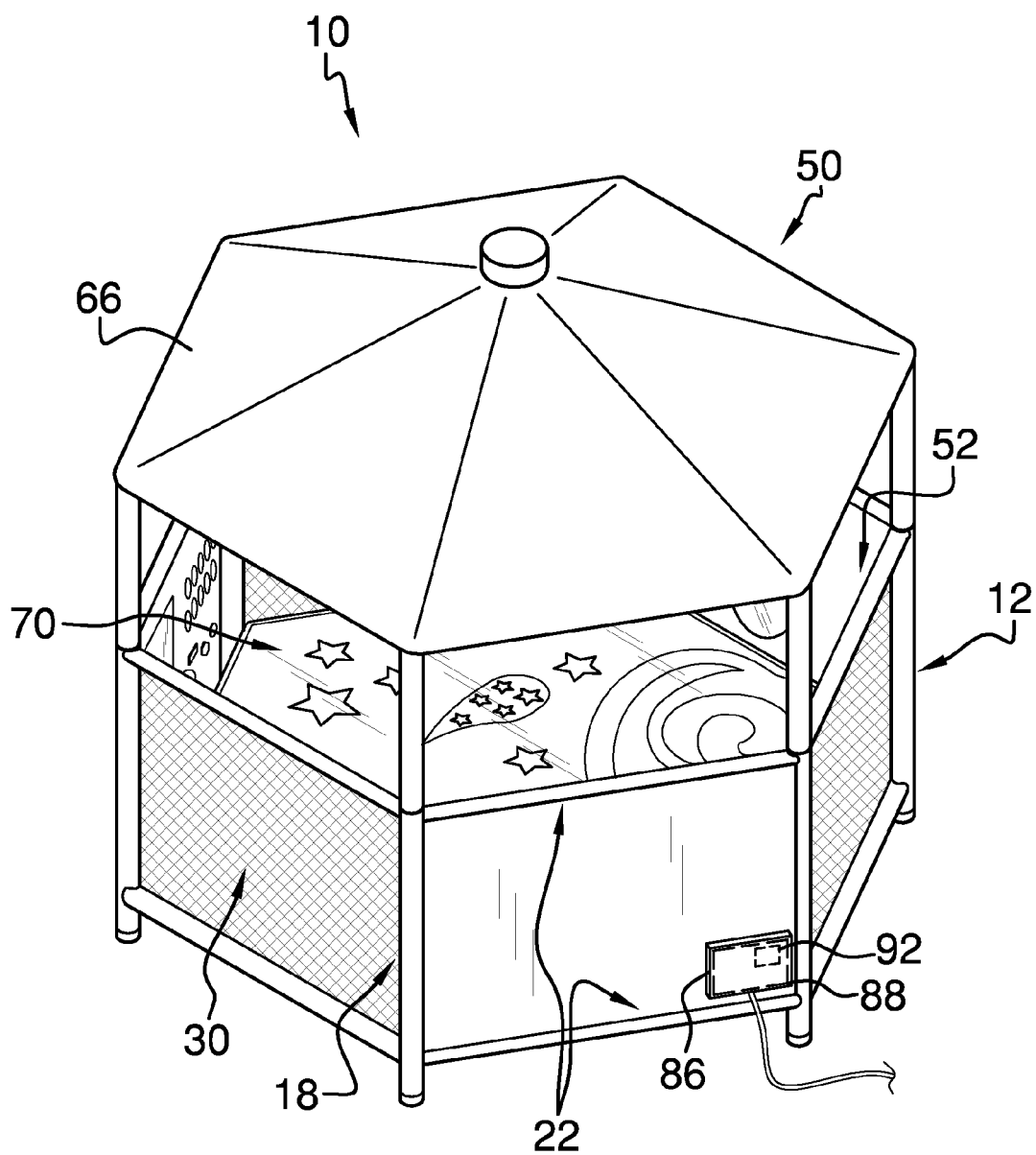
FIG. 1 is a perspective view of a temperature sensing playpen assembly according to an embodiment of the disclosure.
Figure 2:
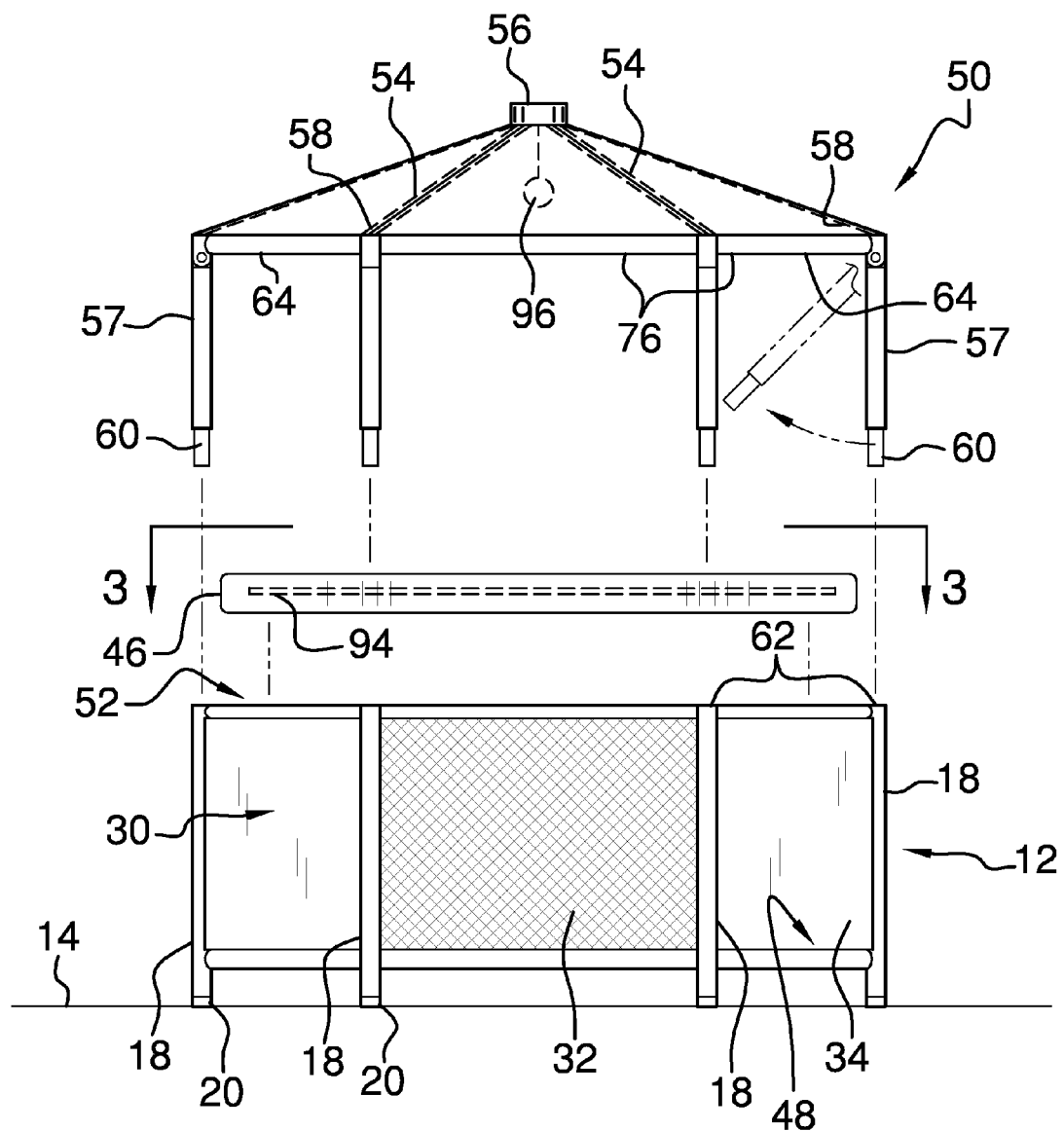
FIG. 2 is an exploded back view of an embodiment of the disclosure.
Figure 3:
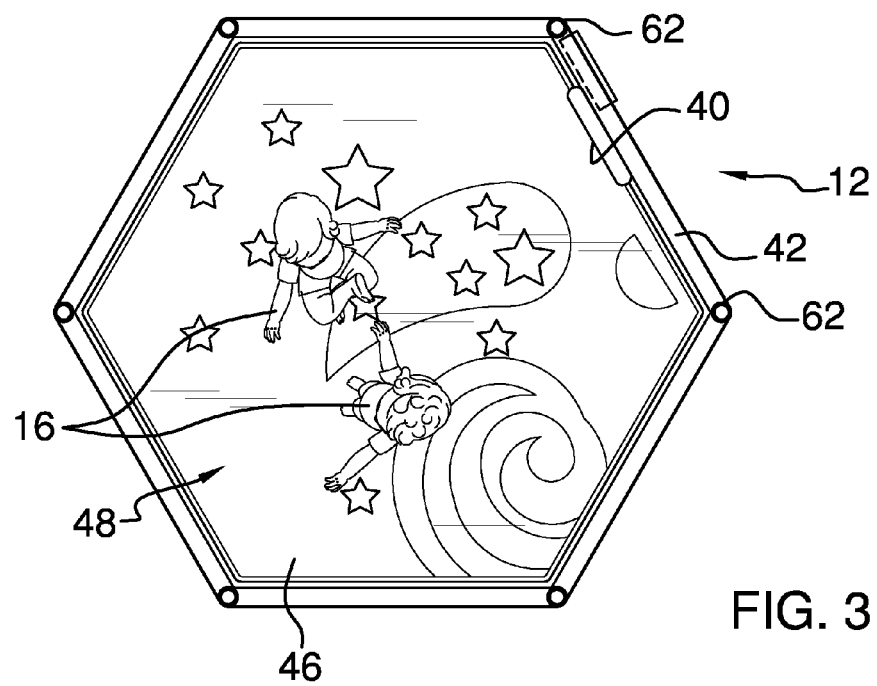
FIG. 3 is a cross sectional view taken along line 3-3 of FIG. 2 of an embodiment of the disclosure.
Figure 4:
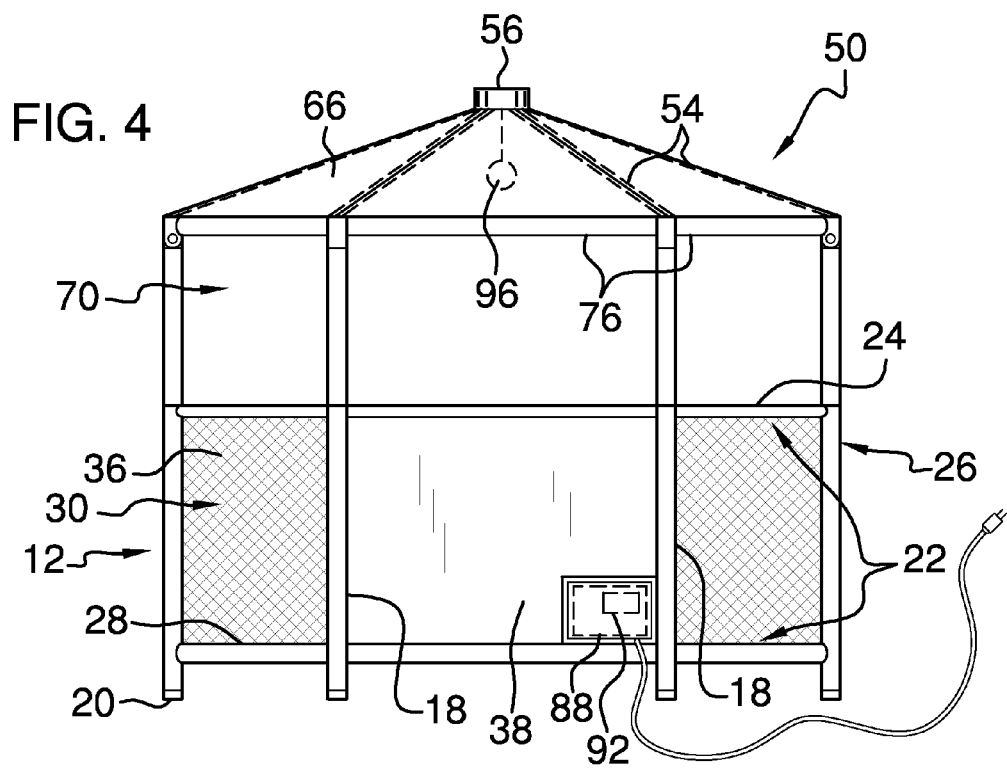
FIG. 4 is a front view of an embodiment of the disclosure.
Figure 5:
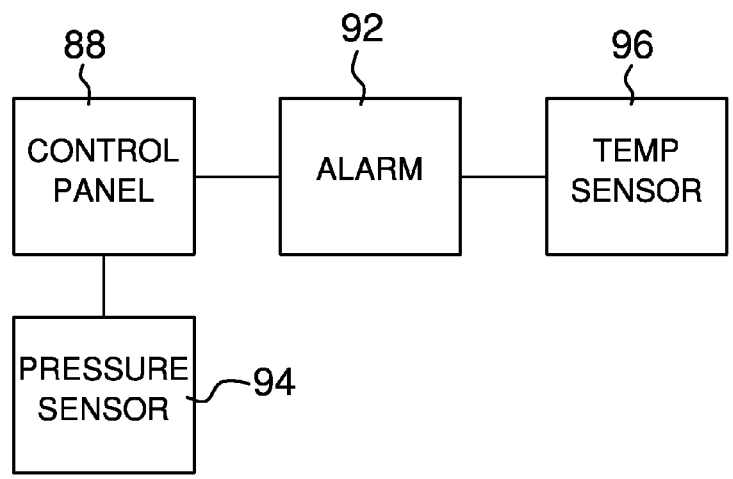
FIG. 5 is a schematic view of an embodiment of the disclosure.
Figure 6:
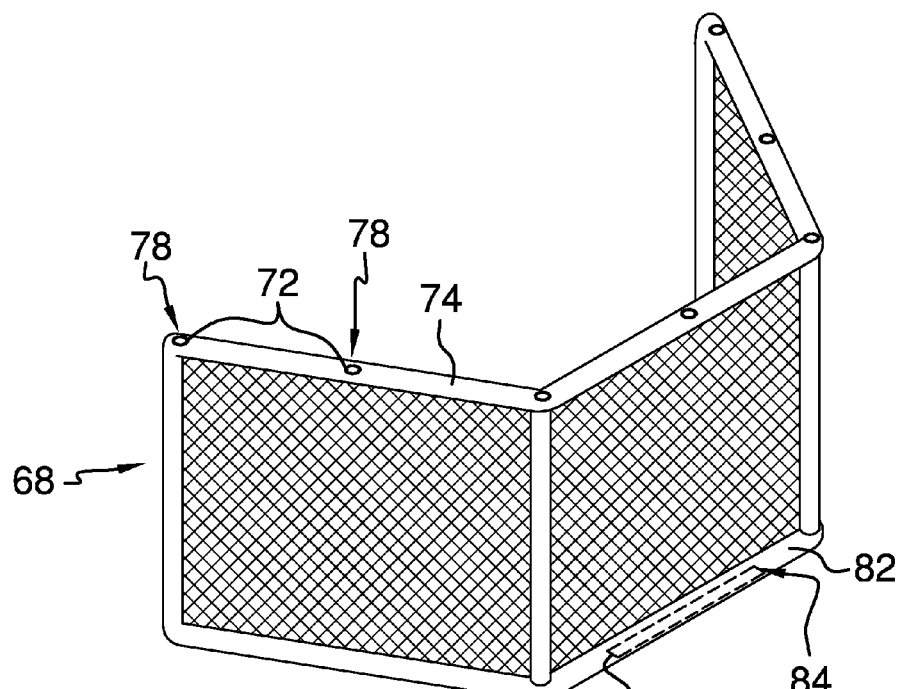
FIG. 6 is a side perspective view of an embodiment of the disclosure.
Figure 7:
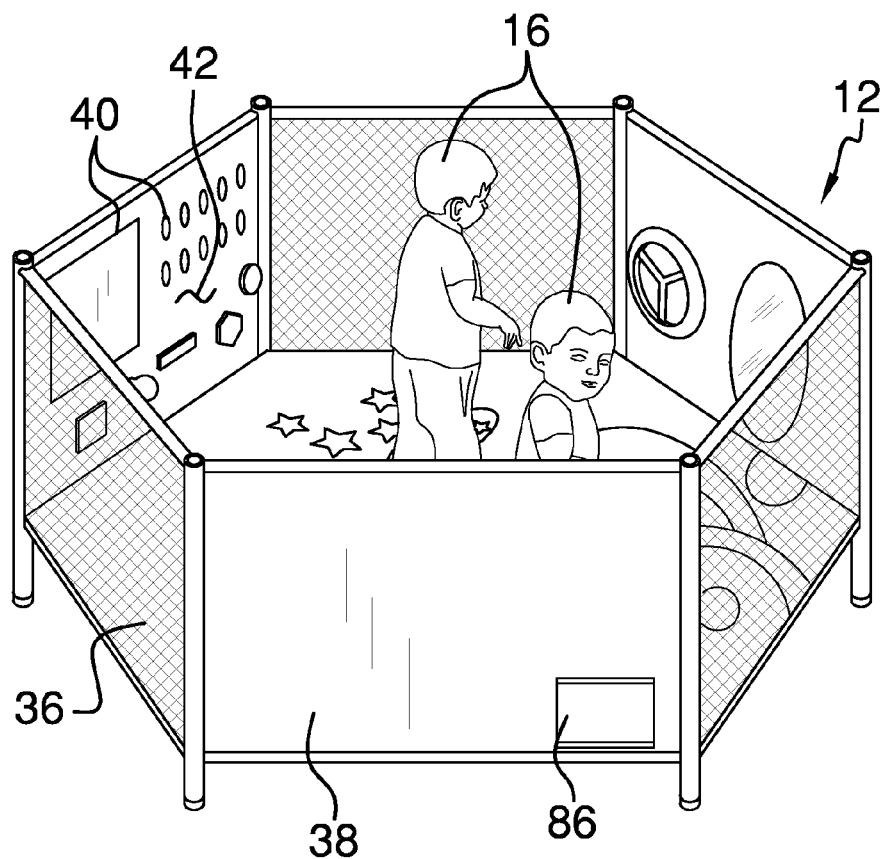
FIG. 7 is a top perspective view of an embodiment of the disclosure.

With reference now to the drawings, and in particular to FIGS. 1 through 7 thereof, a new temperature sensing playpen device embodying the principles and concepts of an embodiment of the disclosure and generally designated by the reference numeral 10 will be described.

As best illustrated in FIGS. 1 through 7, the temperature sensing playpen assembly 10 generally comprises a base frame 12 that may be positioned on a support surface 14 so a child 16 may be positioned within the base frame 12. The base frame 12 comprises a plurality of legs 18. A bottom 20 of each of the plurality of the legs 18 abuts the support surface 14 so each of the plurality of legs 18 extends upwardly from the support surface 14. A plurality of base frame arms 22 is coupled to and extends between each of the plurality of legs 18 so the base frame 12 has a hexagonal shape.

The plurality of base frame arms 22 comprises a pair of sets. A first set 24 of the base frame arms 22 is positioned proximate a top 26 of each of the plurality of legs 18. A second set 28 of the base frame arms 22 is positioned proximate the bottom 20 of the plurality of legs 18. The base frame 12 may have a width and length between 140 cm and 160 cm. The base frame 12 may have a height between 76 cm and 101 cm.

A wall 30 is coupled to and extends between each of the first 24 and second 28 sets of the base frame arms 22 so the wall 30 encompasses an entire perimeter of the base frame 12. The wall 30 comprises a first set 32 and a second set 34 of panels. The first 32 and second 34 sets of the panels are alternatively distributed around the entire perimeter of the base frame 12.

The first set of panels 32 may comprise a mesh screen 36. The second set of panels 34 may comprise a play wall 38. A plurality of objects 40 may be coupled to an inner surface 42 of the play wall 38. The plurality of objects 40 may comprise developmental toys 44 that may be manipulated by the child 16. A pad 46 is positionable on a floor 48 of the base frame 12 so the pad 46 may cushion the floor 48 of the base frame 12. The floor 48 of the base frame 12 may support a load between 40 kg and 50 kg. The child 16 may be positioned on the pad 46 to play in the interior of the base frame 12.

A canopy frame 50 is removably positionable on a top 52 of the base frame 12. The canopy frame 50 comprises a plurality of upper canopy arms 54 coupled to and radiating outwardly from a central portion 56 of the canopy frame 50. A plurality of supports 57 is hingedly coupled to and extends downwardly from a free end 58 of an associated one of each of the plurality of upper canopy arms 54. A bottom end 60 of each of the supports 57 is removably positionable within an open top end 62 of an associated one of each of the plurality of legs 18 so the canopy frame 50 extends upwardly from the base frame 12. The canopy frame 50 may have a width and a length being equal to the width and length of the base frame 12.

A plurality of lower canopy arms 64 is coupled to and extends between each of the supports 57 so the canopy frame 50 has a hexagonal shape. An umbrella 66 is coextensively coupled to each of the upper canopy arms 54. The umbrella 66 extends from the central portion 56 of the canopy frame 50 to the plurality of lower canopy arms 64. The umbrella 66 may shade the floor 48 of the base frame 12. The umbrella 66 may be comprised of a deformable and fluid impermeable material such as canvas or other similar material.

A screen 68 is removably positionable between the canopy frame 50 and the base frame 12 when the canopy frame 50 is positioned on the base frame 12. The screen 68 may completely cover an opening 70 between the canopy frame 50 and the base frame 12. The screen 68 may keep mosquitoes out of the interior of the base frame 12.

A plurality of fasteners 72 is coupled to and evenly distributed along a top 74 of the screen 68. The fasteners 72 engage a bottom 76 of each of the lower canopy arms 64 so the screen 68 is retained on the canopy frame 50. The plurality of fasteners 72 may comprise a snap 78. A retainer 80 is coupled to a bottom 82 of the screen 68. The retainer 80 engages the top 52 of the base frame 12 so the screen 68 is retained in the base frame 12. The retainer 80 may comprise a hook and loop fastener 84.

A pocket 86 is coupled to the wall 30. A control panel 88 is positionable within the pocket 86. The control panel 88 may be a touch screen 90. An alarm 92 is coupled to the control panel 88. The alarm 92 is electrically coupled to the control panel 88.

A pressure sensor 94 is coupled to the pad 46 so the pressure sensor 94 may detect a weight on the pad 46. The pressure sensor 94 is electrically coupled to the control panel 88 so the pressure sensor 94 actuates the control panel 88 when the pressure sensor 94 detects the weight. A temperature sensor 96 is coupled to the central portion 56 of the canopy frame 50. The temperature sensor 96 is electrically coupled to the alarm 92 so the alarm 92 generates an audible alarm when the temperature sensor 96 senses a trigger temperature. The trigger temperature may be a selectable temperature on the control panel 88.

In use, the trigger temperature may be selected on the control panel 88. Up to three children 16 may be positioned within the base frame 12 to provide a safe place for the children 16 to play. The canopy frame 50 may be positioned on the base frame 12 to shade the children 16. The alarm 92 may generate the audible alarm to communicate a dangerously high temperature.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A temperature sensing playpen assembly comprising:
  a base frame configured to be positioned on a support surface wherein a child may be positioned within said base frame;
  a wall coupled to said base frame wherein said wall is configured to enclose a center of said base frame;
  a pad being positionable on a floor of said base frame wherein said pad is configured to cushion said floor of said base frame;
  a canopy frame removably positionable on a top of said base frame wherein said canopy frame extends upwardly from said base frame;
  an umbrella coupled to said canopy frame wherein said umbrella is configured to shade said base frame;
  a control panel coupled to said base frame;
  an alarm coupled to said control panel, said alarm being operationally coupled to said control panel;
  a pressure sensor coupled to said pad wherein said pressure sensor is configured to detect a weight on said pad, said pressure sensor being operationally coupled to said control panel; and
  a temperature sensor coupled to said canopy frame, said temperature sensor being operationally coupled to said alarm wherein said alarm emits an audible alarm; said temperature sensor being electrically coupled to said alarm wherein said alarm generates an audible alarm when said temperature sensor senses a trigger temperature and wherein said trigger temperature is indicative of an unsafe temperature condition within said base frame.

2. The assembly according to claim 1, further comprising said base frame comprising a plurality of legs, a bottom of each of said plurality of said legs abutting the support surface wherein each of said plurality of legs extends upwardly from said support surface.

3. The assembly according to claim 2, further comprising a plurality of base frame arms coupled to and extending between each of said plurality of legs wherein said base frame has a hexagonal shape.

4. The assembly according to claim 3, further comprising said plurality of base frame arms comprising a pair of sets, a first set of said base frame arms being positioned proximate a top of each of said plurality of legs, a second set of said base frame arms being positioned proximate said bottom of said plurality of legs.

5. The assembly according to claim 1, further comprising:
  said base frame comprising a plurality of legs;
  a plurality of base frame arms coupled to and extending between each of said plurality of legs;
  said plurality of base frame arms comprising a pair of sets; and
  said wall being coupled to and extending between each of said pair of sets of said base frame arms wherein said wall encompasses an entire perimeter of said base frame.

6. The assembly according to claim 5, further comprising said wall comprising a first set and a second set of panels.

7. The assembly according to claim 6, further comprising said first and second sets of said panels being alternatively distributed around the entire perimeter of said base frame.

8. The assembly according to claim 1, further comprising said canopy frame comprising a plurality of upper canopy arms coupled to and radiating outwardly from a central portion of said canopy frame.

9. The assembly according to claim 8, further comprising a plurality of supports hingedly coupled to and extending downwardly from a free end of an associated one of each of said plurality of upper canopy arms.

10. The assembly according to claim 9, further comprising a plurality of lower canopy arms coupled to and extending between each of said supports wherein said canopy frame has a hexagonal shape.

11. The assembly according to claim 10, further comprising:
  said base frame comprising a plurality of legs; and
  a bottom end of each of said supports being removably positionable within an open top end of an associated one of each of said plurality of legs wherein said canopy frame extends upwardly from said base frame.

12. The assembly according to claim 1, further comprising:
  said canopy frame comprising a plurality of upper and lower canopy arms;

said umbrella being coextensively coupled to each of said upper canopy arms wherein said umbrella extends from a central portion of said canopy frame to said plurality of lower canopy arms.

13. The assembly according to claim 1, further comprising said pressure sensor being electrically coupled to said control panel wherein said pressure sensor actuates said control panel.

14. The assembly according to claim 1, further comprising said temperature sensor being coupled to a central portion of said canopy frame.

15. A temperature sensing playpen assembly comprising:
- a base frame configured to be positioned on a support surface wherein a child may be positioned within said base frame, said base frame comprising;
- a plurality of legs, a bottom of each of said plurality of said legs abutting the support surface wherein each of said plurality of legs extends upwardly from said support surface;
- a plurality of base frame arms coupled to and extending between each of said plurality of legs wherein said base frame has a hexagonal shape, said plurality of base frame arms comprising a pair of sets, a first set of said base frame arms being positioned proximate a top of each of said plurality of legs, a second set of said base frame arms being positioned proximate said bottom of said plurality of legs;
- a wall coupled to and extending between each of said pair of sets of said base frame arms wherein said wall encompasses an entire perimeter of said base frame, said wall comprising a first set and a second set of panels, said first and second sets of said panels being alternatively distributed around the entire perimeter of said base frame;
- a pad being positionable on a floor of said base frame wherein said pad is configured to cushion said floor of said base frame;
- a canopy frame removably positionable on a top of said frame, said canopy frame comprising;
- a plurality of upper canopy arms coupled to and radiating outwardly from a central portion of said canopy frame;
- a plurality of supports hingedly coupled to and extending downwardly from a free end of an associated one of each of said plurality of upper canopy arms, a bottom end of each of said supports being removably positionable within an open top end of an associated one of each of said plurality of legs wherein said canopy frame extends upwardly from said base frame;
- a plurality of lower canopy arms coupled to and extending between each of said supports wherein said canopy frame has a hexagonal shape;
- an umbrella coextensively coupled to each of said upper canopy arms wherein said umbrella extends from said central portion of said canopy frame to said plurality of lower canopy arms wherein said umbrella is configured to shade said base frame;
- a control panel coupled to said base frame;
- an alarm coupled to said control panel, said alarm being electrically coupled to said control panel;
- a pressure sensor coupled to said pad wherein said pressure sensor is configured to detect a weight on said pad, said pressure sensor being electrically coupled to said control panel wherein said pressure sensor actuates said control panel; and
- a temperature sensor coupled to said central portion of said canopy frame, said temperature sensor being electrically coupled to said alarm wherein said alarm generates an audible alarm when said temperature sensor senses a trigger temperature and wherein said trigger temperature is indicative of an unsafe temperature condition within said base frame.

* * * * *